C. H. McKEE.
PLOWING MACHINE.
APPLICATION FILED AUG. 30, 1912.
1,222,116.
Patented Apr. 10, 1917.
2 SHEETS—SHEET 1.
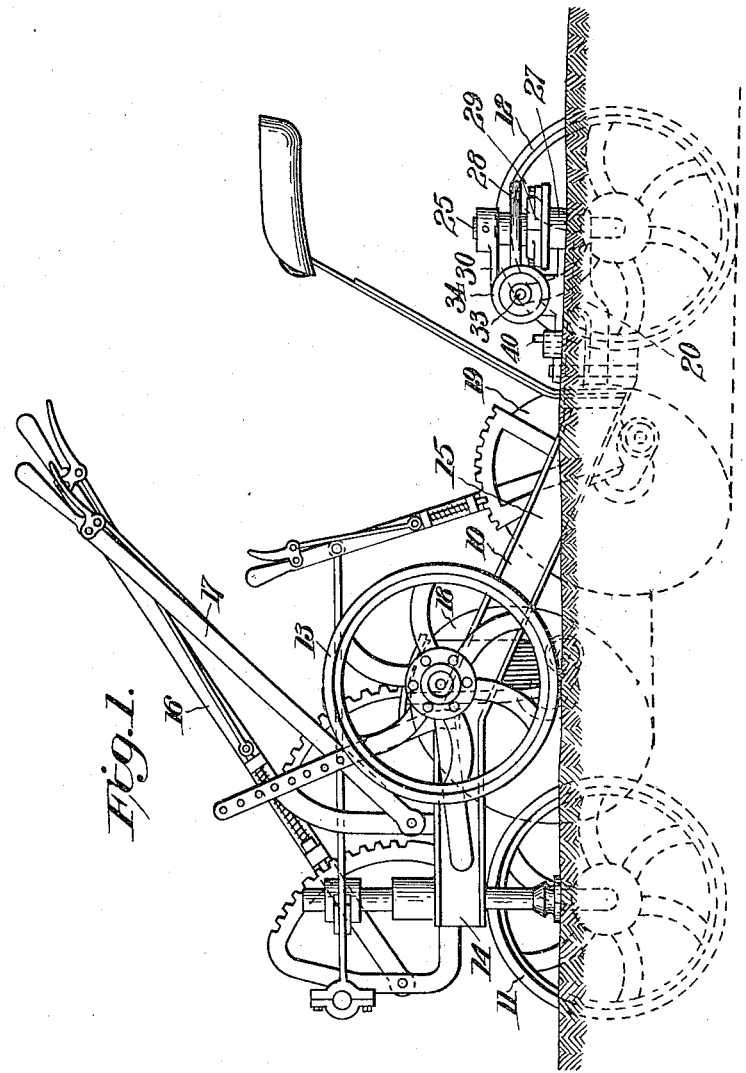
WITNESSES
INVENTOR

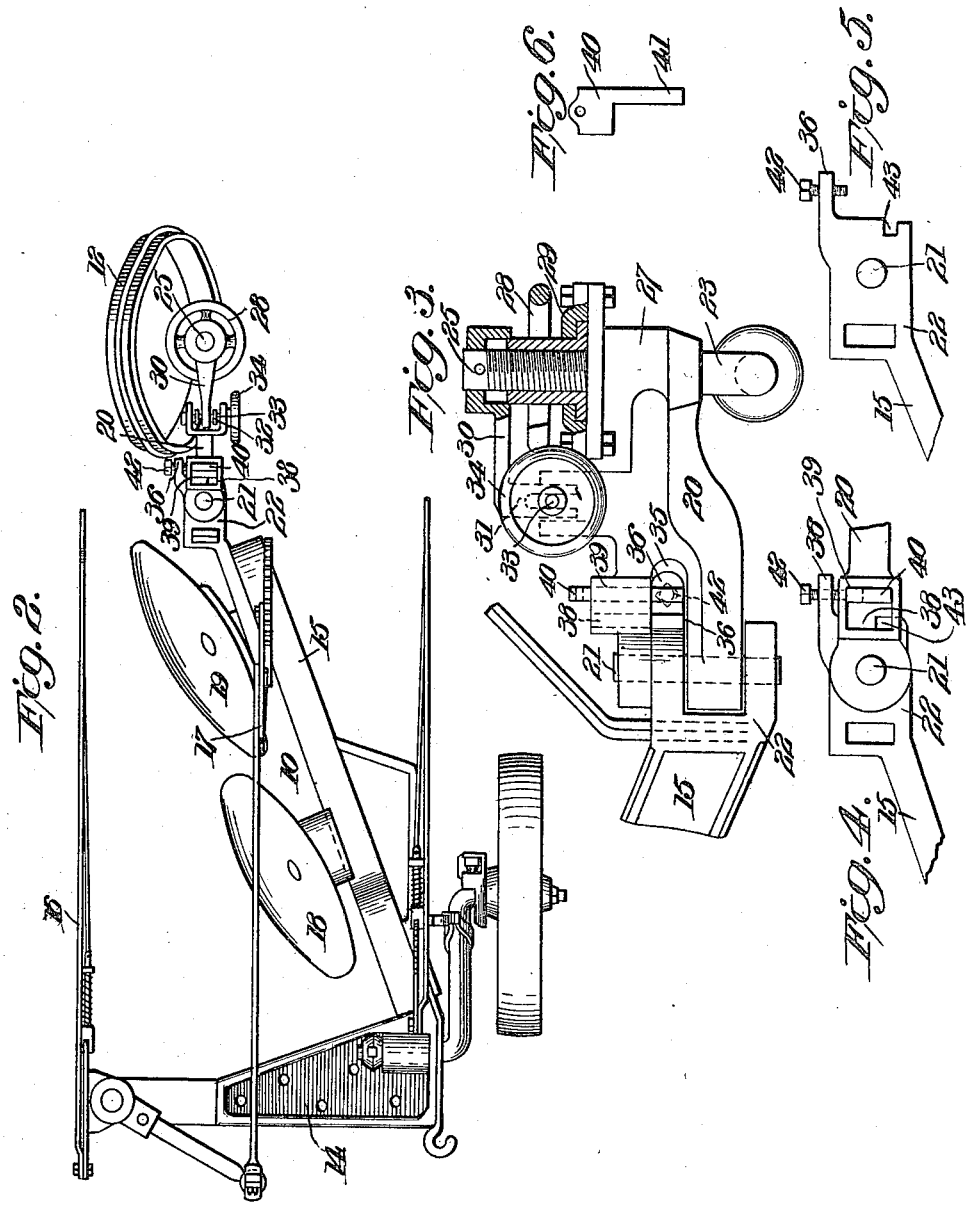

UNITED STATES PATENT OFFICE.

CHARLES H. McKEE, OF PITTSBURGH, PENNSYLVANIA.

PLOWING-MACHINE.

1,222,116.  Specification of Letters Patent.  Patented Apr. 10, 1917.

Application filed August 30, 1912. Serial No. 717,967.

*To all whom it may concern:*

Be it known that I, CHARLES H. McKEE, a citizen of the United States, residing at Pittsburgh, in the county of Allegheny and State of Pennsylvania, have invented new and useful Improvements in Plowing-Machines, of which the following is a specification.

My invention relates to and is an improvement upon devices of the class wherein concave rotary disks are employed, diagonally of their furrows, with their tops deflected back, and arranged with each disk in advance of, higher than, and to the land side of the next succeeding one, as described in Letters Patent of the United States 942,469, pertaining to the invention therein described and now known as the Spalding deep tilling machine.

Having regard to the successful operation of such machines, it is desirable that their disks be held in their correct working positions, as nearly as may be, with respect to their cutting edges, and so that they neither rub too much on their backs, nor be inclined to cut in too deep.

Such machines are so constructed that their disks are attached by means of their journals and hangers, and are carried at the side of, and below the axis of the principal member of the frame of the machine, known as the back-bone. The said frame is carried and steadied in place, when the machine is in operation, by three wheels, one of which, known as the land wheel, runs at the side of the machine, on the unplowed ground; another, known as the front furrow wheel, runs in the last preceding open furrow; and the other, known as the rear furrow wheel, runs behind the rear deep cutting disk in the furrow made by it. When the machine is in its normal operating position, its backbone is carried diagonally of the line of forward movement, with its front end over the unplowed ground, and its rear end depressed and in the furrow behind the rear disk.

As is well known, by persons familiar with the machine, the most satisfactory results are obtained when its adjustments and the hitch to it are so made that the furrow wheels run steadily in their respective paths and control the disks, and if such control is lost, and the disks be allowed to dominate the machine, as it encounters the resistances incident to its operation, it becomes unsteady and may at times jerk about in an unconstrained manner. In view of the foregoing it is apparent that it is important, in order that the machine may be best adapted for its purpose, that the furrow wheels and the back-bone (having the disks attached thereto) shall be properly mounted and adjusted with respect to each other.

Provision is already made in such machines for regulating the position of the front end of the back-bone laterally by "letting out" or "taking in" the front cross beam of the frame with respect to the front furrow wheel. By manipulating the levers with which the land wheel and the front furrow wheel are equipped, the operator may, at will, determine the elevation at which the front end of the back-bone is carried and, because the hitch is to the front end of the machine, the tendency of the draft is to pull the front end in line ahead of the rear end and to hold it there.

The position of the rear end of the backbone, both vertically and laterally, depends from time to time on its relation to the base of the rear furrow wheel, by means of which the rear end of the back-bone is carried. And, since the rear furrow wheel, instead of following a path wholly independent of the movement of the machine, runs in the furrow which is made immediately ahead of it by the rear disk, it is obvious that the position of the rear end of the backbone is much more difficult of control than that of the front end, which end is always in a measure anchored and steadied in place, so long as the machine is carried forward with its front furrow wheel running in the bottom of the last preceding open furrow.

One of the chief functions of the rear furrow wheel is to act as a rotating guide and to steady the disks, and especially the rear one in place, when in operation, much the same as the heel of a carpenter's plane serves its bit, and the best results are had when the rear furrow wheel has a stable path and is so loaded and adjusted that it runs with a firm tread close to the bottom, or against the sloping wall of the furrow in which its path lies.

When one of these machines is in operation the position of its rear disk and its rear furrow wheel are at all times mutually dependent, and readjustments may be required frequently. For instance, if one of such machines is set up with its rear furrow wheel and its rear disk in proper relative positions for cutting a furrow of a given depth and width, in a certain soil, and if the disk becomes worn so as to reduce its diameter, the relation between it and the rear furrow wheel will cease to be right, for as the disk is worn down the furrow cut by it becomes less in depth and width, and since the furrow so made furnishes the path for the rear wheel, the latter will tend to raise the rear end of the machine out, and thus interfere with plowing as deep as it otherwise would.

Then again, regardless of the wear on the rear disk, if the rear disk be set in place with respect to the rear furrow wheel to do a certain work and if the character thereof be altered, as by changing the width of the front end of the machine to cut a wider or narrower furrow, or by varying its elevation so as to cut a deeper or shallower furrow, or if there comes a change in the character of the soil, or the density of the earth, so that the rear furrow wheel sinks in its path to a greater or lesser depth than ordinarily, in every of such events good results call for a new adjustment, and usually both vertically and laterally, as between the rear disk and the rear furrow wheel. One of the objects of my invention is to provide means for making such adjustments, and in so doing, it is intended that the same shall be accomplished in such manner that the broken joint at the rear end of the back-bone of the machine, as originally constructed shall not be sacrificed, since it facilitates the turning of the machine.

It is also a part of the design of my invention to employ such broken joint, together with other improved means, for varying the angle between the back-bone and the swinging member to which the rear furrow wheel is attached, so as to hold the disks to their correct working positions, and also to make provision, at the same time, for adjusting the rear furrow wheel to run longitudinally of the furrow, or with such gather, if any, as desired, and thereby avoid, as fully as may be, any increase in draft incident to its running diagonally of the furrow.

The invention will be hereinafter fully set forth and particularly pointed out in the claims.

In the accompanying drawings:—

Figure 1 is a side elevation of a tilling machine embodying my invention. Fig. 2 is a plan view thereof. Fig. 3 is an enlarged detail side view of the swinging member and its adjuncts. Fig. 4 is a detail plan view of the locking connection for said swinging member. Fig. 5 is a detail plan view of the casting to which the swinging member is pivoted. Fig. 6 is a detail illustrating the locking member.

Referring to the drawing, 10 designates the frame of a tilling machine supported upon front and rear furrow wheels 11, 12, respectively, and upon a land wheel 13. Frames of different patterns or forms may be employed, that illustrated comprising a metal frame provided with a transverse front member 14 and a back-bone member 15, said members 14 and 15 being sufficiently high to pass over weeds and trash without clogging. The backbone 15 extends diagonally to the rear from one end of the transverse member 14 and is also deflected downwardly. The forward end of the frame is raised or lowered by means of a lever 16 pivotally supported by the frame and operatively connected with the front furrow wheel 11. A similar lever 17 carried by the frame is operatively connected with the land wheel 13 mounted in suitable bearings. Carried by the back-bone member 15 are concave rotary disks 18, 19, the disk 18 being in advance of, higher than, and to the land side of the disk 19.

A swinging bar or member 20 is pivoted or hinged at its forward end on a vertical axis 21 supported by a casting 22 secured to the rear end of the backbone 15. The rear end of said swinging member 20 is mounted and carried upon the rear furrow wheel axle 23. Said axle is provided with a single bend therein located at or close to the spindle on the end thereof on which spindle the rear furrow wheel 12 is mounted. The stem or main portion 25 of such rear furrow wheel axle, consists of a round shaft, which is carried in an upright position and the upper end thereof extends through a bearing or box 27 located at the rear end of the swinging member 20, said upper end being threaded. Working upon the threaded portion of the stem 25 is an internally threaded hand wheel 28, the hub of said wheel being flanged to engage a retaining collar 29 secured to the swinging member 20. By this arrangement the link sustains the weight of the rear end of the frame, and said rear end is raised or lowered by rotating hand wheel 28 and without interfering with rotary adjustments of stem 25. To the upper end of the stem 25 is rigidly attached a horizontal arm 30 the free end of which is provided with a depending finger 31. The horizontal arm 30 when in its normal position extends forward from the top of the stem 25 above and parallel with the upper edge of the swinging member 20. The hub of wheel 28 telescopes with a cap like portion of arm 30, to afford protection for the threads on stem 25. The forward end of arm 31 is forked to engage a nut 32 mounted on a threaded rod 33 operated by a hand wheel 34 and carried by member 20. The forward end of swinging member 20 is provided with a horizontal recess 35 to receive a projection 36 carried by casting 22. The upper wall of recess 35 is provided with openings 38, 39 adapted to receive a locking member 40. Said locking member is provided at one end with a single finger 41. An adjusting screw 42 is carried by the projection 36 and adapted to form an adjustable abutment for the locking member 39. When member 40 is inserted in opening 39 with finger 41 in alinement with the abutment 42 the member 20 is free to swing subject to the restraint of abutment 42. When said member 40, however, is inserted in opening 38, the finger 41 engages a recess 43 in casting 22, and rigidly locks member 20 against swinging movement. This is desirable, at times, as for instance when moving the machine about from place to place, or operating it on the banks of ditches, and the like. Ordinarily, however, the member 20 is allowed to swing about horizontally, subject to the restraints imposed thereon as before mentioned. In operating the machine with the improvements mentioned it is obvious that by adjusting the screw 34 so as to change the angle between the backbone and swinging member attached to the rear end of the back-bone, the position of that part of the machine will be changed laterally with respect to the base of the rear furrow wheel; by operating the hand wheel 28 the rear end of the back-bone 15 may be adjusted up or down so as to bring the rear disk 19 into any desired working position vertically with respect to the base of the rear furrow wheel 12, and so that in consequence of said two adjustments the rear disk 19 and the rear furrow wheel 12 will be brought into their proper respective working positions, both vertically and laterally; and lastly the adjustments requisite to accomplishing the best result may be completed by swinging the loose end of the horizontal arm 31 so as to bring the rear furrow wheel 12 into proper alinement for running longitudinally in its path or with such gather, if any, as may be desired.

It will be understood that while I have illustrated and described my invention as particularly adapted for use in connection with the Spalding deep tilling machine, I do not desire to limit myself in this particular, and it is obvious that my invention may be employed as an improvement applicable to all kinds of rotary disk plows and gang machines carried on three wheels in the same general way as the Spalding machine.

Having thus explained the nature of my invention, and described an operative manner of constructing and using the same, although without attempting to set forth all of the forms in which it may be made, or all of the forms of its use, what I claim is:—

1. An improvement in tilling machines comprising a frame, a horizontally swinging arm pivoted to the rear portion of said frame, a rear furrow wheel carried by said arm, means carried by said arm for raising and lowering the frame, and means carried by said arm for horizontally angling said furrow wheel.

2. An improvement in tilling machines comprising a frame, a horizontally swinging arm pivoted to the rear portion of said frame, an axle having a portion connected with said arm, a rear furrow wheel mounted on said axle, means carried by said arm for raising and lowering the rear end of said frame, and means carried by said arm for horizontally angling said furrow wheel.

3. An improvement in tilling machines comprising a frame, a horizontally swinging arm pivoted to the rear portion of said frame, an axle having a member connected with said arm and provided with a threaded portion, a rear furrow wheel mounted on said axle, a nut carried by said arm and engaging the threaded portion of said axle to raise and lower the frame, and means carried by said arm for horizontally angling said furrow wheel.

4. An improvement in tilling machines comprising a frame, means for supporting the forward end thereof, a rearwardly extended arm pivotally connected to said frame to swing on a vertical axis, a rear furrow wheel axle having an extension projecting vertically through said arm, a rear furrow wheel carried by said axle, means carried by said arm and coöperating with the extension of said axle for raising and lowering said frame, means connected with said extension for swinging said axle horizontally, and means for actuating said axle-swinging means.

5. An improvement in tilling machines comprising a frame, means for supporting the forward end thereof, a rearwardly extended arm pivotally connected to said frame to swing on a vertical axis, a rear furrow wheel axle having a threaded extension projecting through said arm, a rear furrow wheel carried by said axle, a nut carried by said arm and engaging said threaded extension to raise and lower the frame, means connected with said threaded extension to swing said axle, and means for actuating said axle-swinging means.

6. An improvement in tilling machines comprising a frame, means for supporting the forward end thereof, a rearwardly extended arm pivotally connected to said frame to swing on a vertical axis, a rear furrow wheel axle having a threaded extension projecting through said arm, a rear furrow wheel mounted on said axle, a nut carried by said arm and engaging said threaded extension to raise and lower the frame, a lever rigidly connected with said extension, and means carried by said arm for moving said lever.

7. An improvement in tilling machines comprising a frame, means for supporting the forward end thereof, a rearwardly extended arm pivotally connected to said frame to swing on a vertical axis, a rear furrow wheel axle having an extension projecting vertically through said arm, a rear furrow wheel mounted on said axle, means carried by said arm and coöperating with the extension of said axle to raise and lower the frame, a lever rigidly connected with said extension to swing said axle horizontally, and means carried by said arm for moving said lever horizontally.

8. An improvement in tilling machines or the like, comprising a frame, a horizontally swinging arm pivotally connected to the rear end of said frame, an axle carried by said arm, a rear furrow wheel mounted on said axle, a lever connected with said axle for horizontally angling the rear furrow wheel, and means carried by said arm for moving said lever.

9. An improvement in tilling machines or the like, comprising a frame, a horizontally swinging arm pivotally connected to the rear end of said frame, an axle carried by said arm, a rear furrow wheel mounted on said axle, a lever connected with said axle for horizontally angling the rear furrow wheel, a locking device secured to said pivoted arm and adapted to engage said lever, and means for adjusting said locking device.

10. An improvement in tilling machines or the like, comprising a frame, a horizontally swinging arm pivotally connected to the rear end of said frame, an axle carried by said arm, a rear furrow wheel mounted on said axle, means carried by said arm for raising and lowering the rear end of said frame, a lever connected with said axle for changing the course of the rear furrow wheel, and means carried by said arm for adjusting and locking said lever.

11. An improvement in tilling machines or the like, comprising a frame, a horizontally adjustable arm pivotally connected to the rear end of said frame, an axle carried by said arm, a rear furrow wheel mounted on said axle, means carried by said arm for raising and lowering the rear end of said frame, a lever connected with said axle for changing the course of the rear furrow wheel, said lever being provided with a depending finger and an adjusting device carried by said pivoted arm and adapted to engage said finger.

12. An improvement in tilling machines comprising a frame, a normally swinging arm pivotally connected at its forward end to the rear portion of said frame, a rear furrow wheel axle carried by the rear end of said arm, means carried by said arm for raising and lowering the contiguous portion of the frame, an abutment carried by the frame, and a removable member carried by said arm and coöperating with said abutment to limit pivotal movement of said arm.

13. An improvement in tilling machines comprising a frame, means for supporting the forward end of said frame, a normally swinging rearwardly extended arm pivotally connected at its forward end to said frame to swing on a vertical axis, a rear furrow wheel connected with the rear end of said arm, and a removable member carried by said arm and having a depending portion, said frame being provided with an abutment coöperating with the depending portions of said member to limit the pivotal movement of said arm.

14. An improvement in tilling machines comprising a frame having a projection, a normally swinging arm pivotally connected to the rear portion of said frame, a rear furrow wheel axle connected with the rear end of said arm, a depending member carried by said arm, and an adjustable abutment carried by the said projection and coöperating with said depending member to limit the pivotal movement of said arm.

15. An improvement in tilling machines comprising a frame, a normally swinging arm pivotally connected to the rear portion of said frame, a rear furrow wheel connected with said arm, means carried by said arm for horizontally angling said furrow wheel, and a removable member carried by said arm and coöperating with the frame to prevent pivotal movement of said arm.

16. An improvement in tilling machines comprising a frame, an arm pivotally connected to the rear portion of said frame, a rear furrow wheel connected with said arm, a lever for horizontally angling said furrow wheel with respect to said arm, means for normally preventing movement of said lever, and a removable member carried by said arm and coöperating with the frame to limit pivotal movement of said arm.

17. An improvement in tilling machines comprising a frame, an arm pivotally connected to the rear portion of said frame, a rear furrow wheel connected with said arm, a lever for horizontally angling said furrow wheel, a threaded rod carried by said arm, a nut working on said rod and engaging said lever, and a removable member carried by said arm and coöperating with said frame to limit pivotal movement of said arm.

18. An improvement in tilling machines comprising a frame, a normally swinging arm pivotally connected at its forward end to the rear end of said frame, a rear furrow wheel connected with the rear end of said arm, and a removable locking member carried by said arm, said frame being provided with a recess to receive one end of said locking member to lock said arm against pivotal movement.

19. An improvement in tilling machines comprising a frame, provided with an abutment, an arm pivotally connected to the rear portion of said frame, a rear furrow wheel connected with said arm, and a removable locking member carried by said arm and adapted to coöperate with said abutment to limit the pivotal movement of said arm, said frame being also provided with a recess adapted to receive one end of said locking member when it is desired to prevent pivotal movement of said arm.

20. An improvement in tilling machines comprising a frame, provided with a finger, an abutment carried by said finger, an arm pivotally connected with said frame and slotted to receive said finger, a rear furrow wheel connected with said arm, and a removable locking member carried by said arm and adapted to coöperate with said abutment to limit pivotal movement of said arm, said frame being also provided with a recess adapted to receive one end of said locking member when it is desired to prevent pivotal movement of said arm.

21. An improvement in tilling machines comprising a frame, means for supporting the forward end thereof, a rearwardly extended arm pivotally connected with said frame to swing on a vertical axis, a rear furrow wheel axle having an extension projecting vertically through said arm, a rear furrow wheel carried by said axle, means connected with said extension to swing the furrow wheel horizontally, means for actuating said furrow wheel swinging means, and a reversible device carried by said arm and coöperating with said frame to control pivotal movement of said arm.

In testimony whereof I have hereunto set my hand in presence of two subscribing witnesses.

CHARLES H. McKEE.

Witnesses:
WM. S. HODGES,
A. M. PARKINS.

Copies of this patent may be obtained for five cents each, by addressing the "Commissioner of Patents, Washington, D. C."